Patented Oct. 22, 1946

2,409,679

UNITED STATES PATENT OFFICE 2,409,679

POLYMERS OF ETHYLENE AND HALOVINYL COMPOUNDS AND PROCESSES FOR THEIR PREPARATION

William E. Hanford, Wilmington, and John R. Roland, McDaniel Heights, Del., assignors to E. I. du Pont de Nemours & Company, Wilmington, Del., a corporation of Delaware No Drawing. Application November 1, 1941, Serial No. 417,477

3 Claims. (Cl. 260—84)

This invention relates to new polymeric materials and, more specifically, to polymers of ethylene with polymerizable alpha-halovinyl compounds, as well as to a process for their preparation.

It is an object of this invention to provide polymers of alpha-halovinyl compounds and ethylene. It is an additional object to provide methods for producing such polymers. It is a more specific object of this invention to provide polymers of alpha-haloacrylates with ethylene. Other objects and advantages will be apparent from the following description of the invention.

According to the present invention, polymers of alpha-halovinyl compounds and ethylene are prepared by heating these two compounds alone, or together with another polymerizable organic compound, in the presence of a polymerization catalyst, under elevated temperature conditions. The following general procedure illustrates one manner of practicing the process of this invention, which may be operated batchwise, semicontinuously, or continuously.

A pressure-resistant reaction vessel is charged with a polymerization catalyst and alpha-halovinyl compound. If desired water, or an organic liquid solvent, or both, may be included in the charge. The vessel is then closed, placed in a heated shaker machine, and connected to a source of ethylene. Controlling and recording thermocouples are inserted, ethylene is added to the reaction vessel, and heating and agitation are started. Upon reaching the reaction temperature, or after a period of induction, the reaction starts and is normally followed by a pressure decrease due to the utilization of the ethylene. The pressure in the system is maintained throughout the reaction period either by the addition of fresh ethylene or alpha-halovinyl compound, or a mixture of the two, or by decreasing the free space in the reaction vessel by increasing the volume of the menstruum.

When the reaction is complete, as evidenced by cessation of absorption of ethylene, the vessel is cooled, bled of excess ethylene, opened, and the reaction mixture discharged. The polymer is isolated from the reaction mixture by means known to the art. A further modification of the invention, as indicated in the previous general statement of the invention, includes the polymerization of a third polymerizable organic compound with the alpha-halovinyl compound and ethylene. The third material may be added with the catalyst and alpha-halovinyl compound or, if it is a gas, at normal temperatures and pressures, it may be expanded from pressure storage tanks into the closed reaction vessel prior to pressuring with ethylene.

The operating conditions employed in carrying out this invention may vary over a wide range. Thus, the temperatures used may be in the range of from 40° to 350° C., generally from 50° to 250° C., and preferably from 50° to 150° C. Since, in general, the molecular weight of the product is an inverse function of the reaction temperature, the latter is kept as low as is consistent with practical reaction rates.

The reaction is carried out under superatmospheric pressures and generally at pressures in the range of from 50 to 1500 atmospheres, and preferably in the range of 200 and 1000 atmospheres. The upper limit of pressure which can be used, however, is that dictated by the strength of the equipment. The temperature and pressure are interdependent variables and either must therefore be adjusted with regard to the other.

The polymerization may be carried out in solution, in water suspension, or in an aqueous emulsion of the alpha-halovinyl compound. The reaction is preferably carried out in a water-containing medium since products of higher molecular weight are thus obtained.

A further modification of the invention includes the polymerization of alpha-halovinyl compounds and ethylene with a third polymerizable organic compound.

The alpha-halovinyl compounds which are operable in this process are compounds of the class

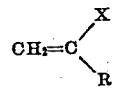

wherein X is halogeno and R is alkyl, aryl, acyloxy, cyano, halogeno, alkoxy, carbalkoxy, carbamyl, N-substituted carbamyl or carboxyl. The preferred class of compounds used in this invention are those wherein X is chloro and R is carboxyl, carbalkoxy, cyano, carbamyl or N-substituted carbamyl.

Suitable examples of such compounds are alpha-chloroacrylic acid, methyl, ethyl, propyl, and higher alpha-chloroacrylates, alpha-chloroacrylonitrile; alpha-chloroacrylamide, N,N-dimethyl-alpha-chloroacrylamide, alpha-chloroacrylanilide, N-methyl-N-phenyl-alpha-chloroacrylamide and the like.

The proportion of alpha-halovinyl compound which may be introduced into the polymer may vary over a wide range. Control of this variable can be effected either by adjusting the amount of alpha-halovinyl compound charged, by varying the ethylene pressure, by varying the ratio of liquid charge to free space in the reactor, or by variation of the choice of reaction temperature.

In the practice of this invention the preferred reaction medium is a water menstruum. It may be desirable, however, to replace all or part of the water with an organic solvent. Solvents satisfactory for this polymerization are toluene, benzene, cyclohexane, normal hexane, isooctane, cyclohexanone, ether, butanol, methanol, dioxane, or acetic acid. If a solvent is to be used, the preferred solvents include toluene, benzene, isooctane, normal hexane, cyclohexane, butyl acetate, ether, dioxane, N,N-dimethylformamide and cyclohexanone. In operating in an aqueous medium it is not necessary to use dispersing agents but the addition of such substances may sometimes be desirable. Suitable examples are starch, the water-soluble salts of the higher alkyl sulfates and alkane sulfonates, alkali metal salts of sulfonated mineral oils, and such non-ionic water-soluble compounds as are obtained by the condensation of several moles of ethylene oxide with long chain amines, alcohols or acids.

As catalysts which may be used in this invention hydrogen peroxide or any compound which is formed from hydrogen peroxide or which may be readily converted to hydrogen peroxide on treatment with dilute sulfuric acids may be considered as a peroxide polymerization catalyst. Examples of such compounds are benzoyl peroxide, tetralin peroxide, acetyl peroxide, higher diacyl peroxides, i. e., lauroyl peroxide, acetyl benzoyl peroxide and other mixed diacyl peroxides, hydrogen peroxide, urea peroxide, butyryl peroxide, peracetic acid, alkali metal and ammonium persulfates, perborates and percarbonates, and the like. There may also be used combinations of the above catalysts as well as combinations of persulfates, e. g., sodium or potassium persulfates with selected buffering agents, e. g., alkali metal phosphates which may be produced by adding sodium hydroxide to phosphoric acid until a pH of about 9 is obtained. Tetraethyl-lead and other organometallic compounds which give rise to free radicals on thermal decomposition are also operative as catalysts in this process, as is also molecular oxygen at temperatures above 125° C. The amount of catalyst used may vary over a wide range but generally speaking it is of the order of 0.1% or more, based on the weight of the total polymerizable monomers. As much as 5-10% of catalyst, based on the total polymerizable monomers, may be employed but it is generally desirable to use less than this since with large amounts of catalyst the molecular weight of the product is usually low.

The following examples illustrate the practice of this invention and demonstrate operable conditions for the polymerization. Parts are by weight unless otherwise specified.

Example 1

A silver lined steel reaction vessel is charged with 60 parts of water, 40 parts of methyl alpha-chloroacrylate, 4 parts of a 65% solution of a sodium salt of sulfated 9, 10-octadecenyl acetate and 0.2 part of benzoyl peroxide. The pH of this mixture is 4.1. The vessel is closed, pressured with ethylene, and heating and agitation started. During a reaction time of 15.5 hours, throughout which the temperature is maintained at 74 to 77° C. and the pressure at 865 to 975 atm., the total observed pressure drop is 295 atm. The vessel is then cooled, opened and the reaction mixture discharged. The pH of this is 1.6. Steam distillable impurities are separated by steam distillation, the polymer filtered, washed free of dispersant, and dried.

There is thus obtained 32.6 parts of a white, powdery polymer which softens at 145 to 148° C. This polymer contains 20.3% chlorine, 55.4% carbon and 8.1% hydrogen. From these analyses it may be calculated that the polymer has an ethylene to ester mole ratio of 1.9:1. The conversion of methyl alphachloroacrylate to polymer is 65% of the theoretical.

Example 2

Example 1 is repeated except that the reaction is carried out at 83° to 87° C. The product, isolated as in Example 1, amounts to 44.9 parts of polymer which softens at 145° to 147° C., (Bloc-Maquenne), and which contains 20.1% chlorine. The conversion of methyl alpha-chloroacrylate to polymer is 76.7% of the theoretical.

Example 3

A silver lined steel reaction vessel is charged with 80 parts of water, 20 parts of alpha-chloroacrylonitrile and 0.2 parts of benzoyl peroxide. The pH of this mixture is 2.0. The vessel is closed, pressured with ethylene, and heating and agitation started. During a reaction time of 9.9 hours, throughout which the temperature is maintained at 75° to 77° C. and the pressure at 940 to 990 atm., the total observed pressure drop is 60 atm. The vessel is cooled, bled of excess ethylene, opened, and the contents discharged. The pH of this mixture is 2.0. Unreacted alpha-chloroacrylonitrile is separated by steam distillation. The residual polymer is filtered from water, washed and dried. There is thus obtained one part of a hard polymer which softens at 120° C., (Bloc-Maquenne), is insoluble in xylene, tetrachloroethylene, and chloroform, and is soluble in N,N-dimethylformamide.

Example 4

Example 3 is repeated except that the reaction is carried out at 89° to 91° C. The product, isolated as in Example 3 amounts to 3.6 parts of polymer which has the same properties as that obtained in Example 3.

The Bloc-Maquenne method employed in determining melting points is described in "Identification of Organic Compounds" by Shriner and Fuson, 2nd edition, page 88.

The ethylene which is used in the practice of this invention should be of good quality. It may, however, contain small quantities of methane, ethane, propane, nitrogen, hydrogen, carbon dioxide or oxygen. Of these only oxygen has a marked effect on the rate and extent of polymerization. Since the effect of large amounts of oxygen is generally deleterious, its concentration in the ethylene should be maintained as low as practical.

For best results, polymerization as described in this invention should be carried out in vessels fabricated of or lined with materials which do not readily catalyze the decomposition of peroxides to molecular oxygen. Suitable examples of this type of material are the stainless steels, silver, aluminum, tin, enamel and glass.

The pH of the reaction medium has an effect upon the rate and extent of polymerization. The most suitable pH range is dependent on the catalyst used. Benzoyl peroxide is most active at pH's of from 1.0 to about 4.0 while persulfates are most effective at a pH above 7.0 and preferably in the range of from 9.0 to 12.0. In the present invention the pH may be adjusted or maintained by use of buffer salts such as potassium dihydrogen phosphate, sodium acetate, sodium tetraborate, sodium carbonate and the like and/or by the addition of acids, such as hydrochloric, sulfuric, hydrobromic, or formic acid or alkalis, e. g. sodium or potassium hydroxide.

The ratio of alpha-halovinyl compound to ethylene in the polymer may be varied widely. Control of this variable may be effected by variation in the relative concentrations of alpha-halovinyl compound and ethylene. The concentration of alpha-halovinyl compound is a function of the amount charged, of the ratio of alpha-halovinyl compound to reaction medium and of the ratio of free space in the reaction vessel to the total liquid charge. The concentration of ethylene is primarily a function of the pressure but is affected to some extent by the nature and amount of the liquid charge, including both the reaction medium and the alpha-halovinyl compound. Variation of the ratio of alpha-halovinyl compound to ethylene is affected to some extent by the reaction temperature.

These polymerizing systems may be further modified by including in the reaction mixture other polymerizable organic compounds such, for example, as at least one of the following: vinyl esters, ethers and ketones such as vinyl chloride, vinyl acetate, vinyl propionate, vinyl benzoate, vinyl methyl ether, vinyl ethyl ether, vinyl butyl ether, vinyl phenyl ether, vinyl methyl ketone, vinyl ethyl ketone and the like; chloroalkenes such as 1,2-dichloroethylene, trichloroethylene, 2-chloro-1,3-butadiene; esters, amides and nitriles of acrylic and methacrylic acids such as methyl, ethyl, propyl and butyl acrylates and methacrylates, acrylamide, methacrylamide, N-alkyl and N,N-dialkyl acrylamides and methacrylamides, acrylonitrile and methacrylonitrile; esters, amides and nitriles of fumaric, maleic, itaconic, and citraconic acids, such as, dimethyl and diethyl fumarates, maleates, itaconates and citraconates and the like, fumaride, maleamide, itaconamide, citroconamide, fumaronitrile, maleonitrile, itacononitrile, citracononitrile; unsaturated hydrocarbons such as propylene, isobutylene, camphene, methylene cyclohexane, octene-1, higher alkene-1's, butadiene, isoprene and the like.

For rapid polymerization it is desirable to provide intimate contact between all reactants by agitation. By the term "agitation" as used herein is meant any means for accomplishing intimate contact between the reactants, e. g., rapid stirring, turbulence in a continuous process, atomization, shaking, or efficient bubbling of the gas or gases through the liquid phase.

Various changes may be made in the details and preferred embodiments of this invention without departing therefrom or sacrificing any of the advantages thereof.

We claim:

1. A process for producing polymers of ethylene and alpha-chloracrylic compounds having a mole ratio of ethylene to ester of about 1.9:1 which comprises heating methyl alpha-chloracrylate at a temperature between 74 and 77° C. under ethylene pressure of from 865 to 975 atmospheres in the presence of a peroxy compound catalyst.

2. A process for producing polymers of ethylene and methyl alpha-chloracrylate having a mole ratio of ethylene to ester of about 1.9:1 which comprises heating methyl alpha-chloracrylate at a temperature between 74 and 77° C. under an ethylene pressure of from 865 to 975 atmospheres in the presence of water and benzoyl peroxide.

3. A polymer of ethylene and methyl alpha-chloracrylate having an ethylene to ester mole ratio of 1.9:1.

WILLIAM E. HANFORD.
JOHN R. ROLAND.